United States Patent [19]

Kato

[11] Patent Number: 4,787,491

[45] Date of Patent: Nov. 29, 1988

[54] SELECTING DEVICE OF A POWER TRANSMISSION SYSTEM FOR A FOUR-WHEEL DRIVE VEHICLE

[75] Inventor: Shoji Kato, Tokyo, Japan

[73] Assignee: Fuji Jukogyo Kabushiki Kaisha, Tokyo, Japan

[21] Appl. No.: 35,639

[22] Filed: Apr. 3, 1987

[30] Foreign Application Priority Data

Apr. 7, 1986 [JP] Japan .................... 61-080685

[51] Int. Cl.$^4$ .................. F16D 41/07; F16D 47/04; B60K 17/34
[52] U.S. Cl. ............................ 192/48.6; 180/248; 180/250; 192/48.92; 192/50; 192/51; 192/108
[58] Field of Search ............... 192/43, 48.6, 48.92, 192/50, 51, 108; 180/248, 249, 250

[56] References Cited

U.S. PATENT DOCUMENTS

| | | | |
|---|---|---|---|
| 2,635,478 | 4/1953 | Wolfe | 192/53 F X |
| 2,667,251 | 1/1974 | Banker | 192/48.92 |
| 2,850,920 | 9/1958 | Buckendale | 180/248 X |
| 2,853,890 | 9/1958 | Kelbel | 180/248 X |
| 3,651,907 | 3/1972 | Myers | 192/48.92 X |

FOREIGN PATENT DOCUMENTS

| | | |
|---|---|---|
| 55-4292 | 1/1980 | Japan . |
| 56-43035 | 4/1981 | Japan . |
| 57-15019 | 1/1982 | Japan . |

Primary Examiner—Rodney H. Bonck
Attorney, Agent, or Firm—Martin A. Farber

[57] ABSTRACT

A power transmission system for a four-wheel drive vehicle has, for the front and rear wheels, a driving power transmitting system for transmitting the output of a transmission with a forward overrunning clutch and a reverse overrunning clutch. Either or both of the overrunning clutches are engaged with a sleeve of a selecting device. An outer race of each overrunning clutch has outer toothings on the periphery thereof and the sleeve has inner toothings. Each inner toothing of the selecting device has chamfers on both axial ends thereof, and each outer toothing has a chamfer on an end opposing the inner toothing. Opposed chamfers of the inner and outer toothings have an angle so that a component in a free rotational direction of the outer toothing is produced by the engagement of the chamfer of the inner toothing.

3 Claims, 4 Drawing Sheets

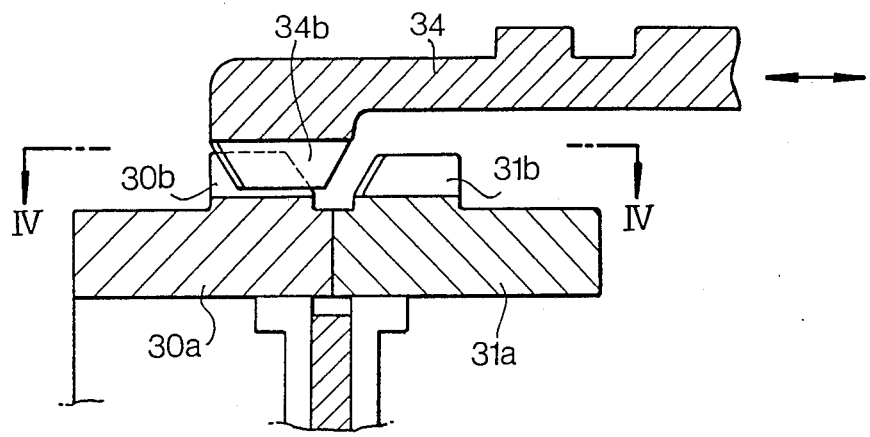
FIG. 3
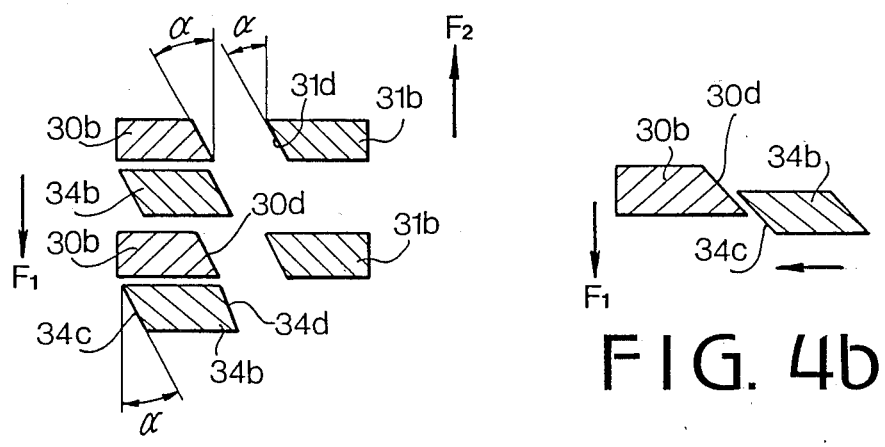
FIG. 4a
FIG. 4b

SELECTING DEVICE OF A POWER TRANSMISSION SYSTEM FOR A FOUR-WHEEL DRIVE VEHICLE

BACKGROUND OF THE INVENTION

The present invention relates to a power transmission system for a full-time four-wheel drive vehicle having a mechanism for absorbing the difference between the speeds of the front and rear wheels.

When a vehicle negotiates corners, the front wheels run through an arc of greater radius than that of the rear wheels and therefore tend to rotate faster than the rear wheels. In a four-wheel drive vehicle without a device for absorbing the difference between the speeds of the front and rear wheels, the difference causes the braking of the vehicle, known as "tight corner braking". In order to prevent such a braking phenomenon, there has been proposed a power transmission system having a double overrunning clutch system for absorbing the difference of speeds of front and rear wheels, and a system for locking the system for preventing at least one of wheels from slipping on slippery roads. The overrunning clutch system comprises forward and reverse overrunning clutches each in the form of a freewheel and a sleeve for selecting forward driving mode, reverse driving mode or a directly connected four-wheel driving mode for the locking of the system. These modes can be selected by engaging toothings of the sleeve with toothings of one of the clutches or with toothings of both clutches.

In such a system, the selecting operation of the clutches must be swiftly completed. However, if each toothing is of a shape having a rectangular tooth crest, toothings of the sleeve can collide with toothings of the selected clutches, when the sleeve approaches the clutch. Thus, a further movement of the sleeve is stopped. Accordingly, proper engagement of the sleeve and the clutch is impossible unless their relative positions are changed by an external force.

If the corners of each toothing are chamfered to form a tapered crest as in toothings of a synchronizer of a transmission, a chamfer of the selected clutch possibly abuts an improper side of the chamfer of the sleeve. Namely, when one of the chamfers of the sleeve abuts against one of the chamfers of the clutch, the clutch is forced to rotate in one direction. If the direction is the locking direction of the clutch, the clutch cannot rotate. Thus, the sleeve also stops shifting.

SUMMARY OF THE INVENTION

The object of the present invention is to provide a power transmission system for a full-time four-wheel drive vehicle which prevents the tight corner braking at corners by providing a double overrunning clutch system, wherein forward and reverse driving modes are smoothly and quickly selected.

The other objects and features of this invention will become understood from the following description with reference to the accompanying drawings.

BRIEF DESCRIPTION OF DRAWINGS

FIG. 3 is an enlarged sectional view showing a part of FIG. 2;

FIG. 4a is a sectional view taken along a line IV—IV of FIG. 3; and

FIG. 4b is a sectional view of toothings, explaining the engaging operation.

DETAILED DESCRIPTION OF THE PREFERRED EMBODIMENT

Figure 1A:
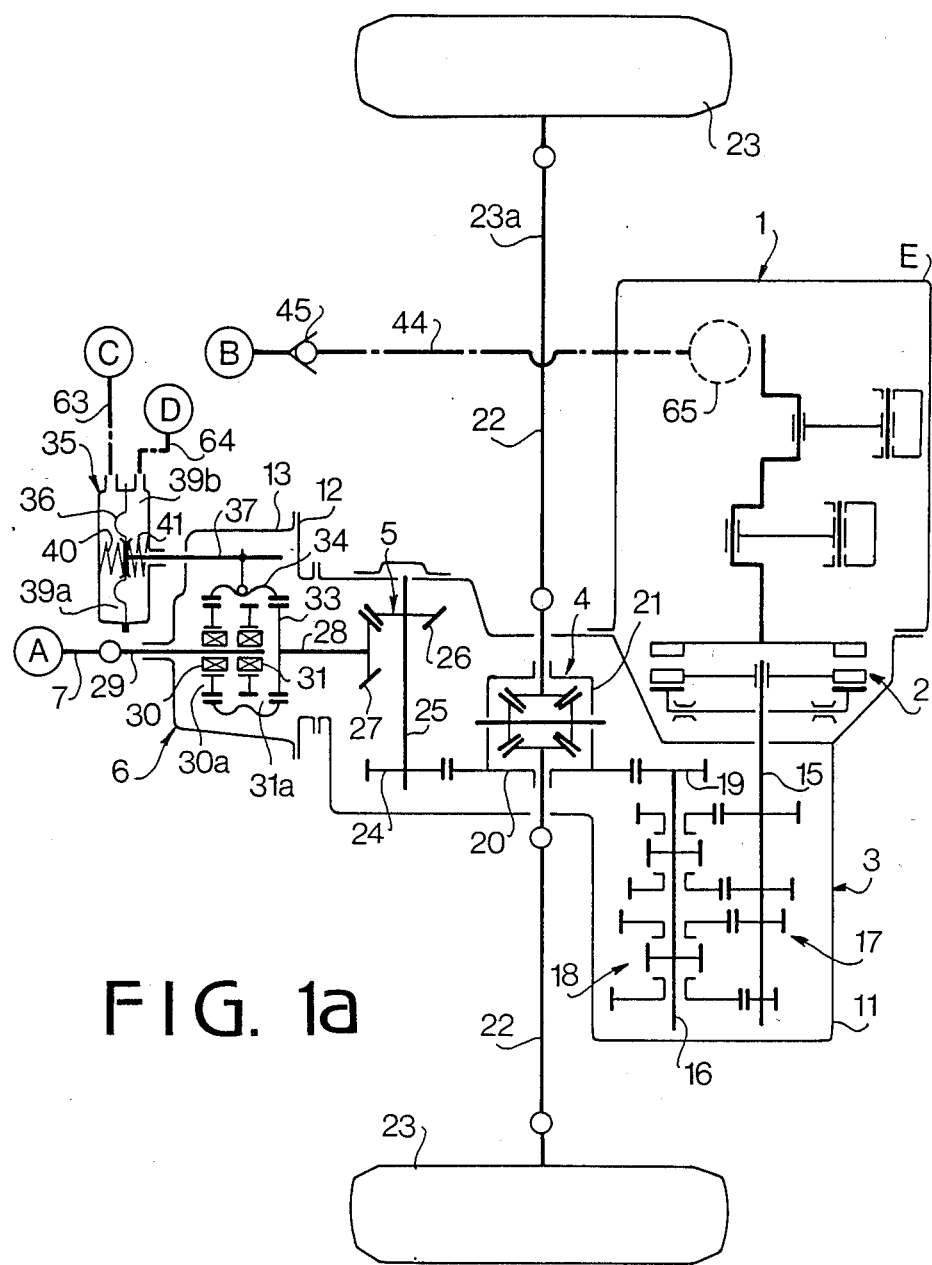
FIGS. 1a and 1b show a schematic illustration showing a power transmission system according to the present invention.
Figure 1B:
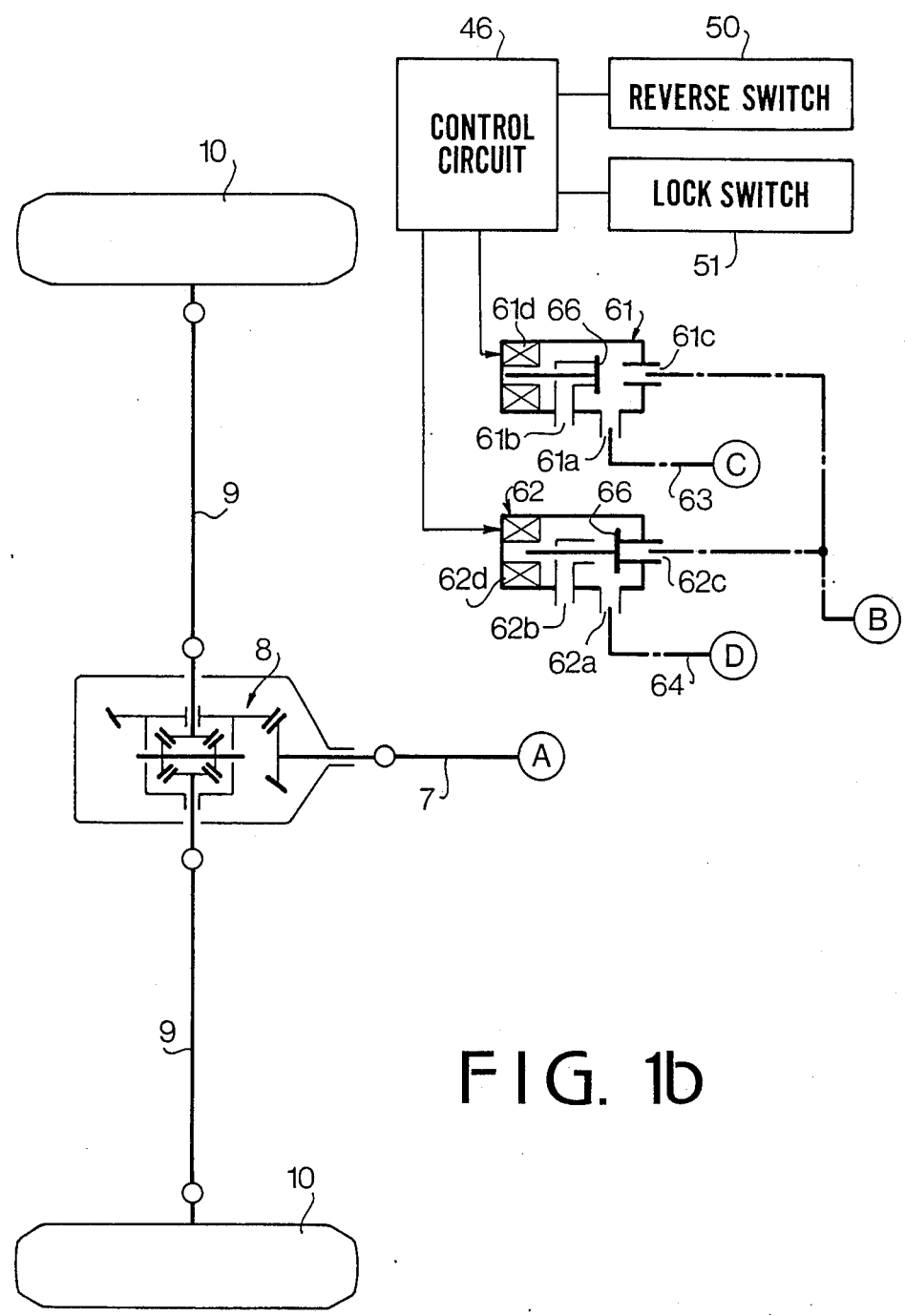

Referring to FIGS. 1a and 1b, an engine unit E is transversely mounted on a rear portion of a vehicle. The engine unit has an engine 1, clutch 2 and transmission 3. The output of the transmission 3 is transmitted to rear wheels 23 through a differential 4 and axles 22. The output of the transmission 3 is also transmitted to front wheels 10 through a front wheel driving power transmission system comprising a transfer device 5, double overrunning clutch 6, propeller shaft 7, differential 8, and axles 9. A case 13 of the clutch 6 is secured to a case 11 of the transmission 3 through an intermediate case 12. The transmission 3 comprises an input shaft 15, output shaft 16, a plurality of change-speed gears 17, and synchronizers 18. An output gear 19 engages with a ring gear 20 secured to a case 21 of the differential 4. The transfer device 5 comprises a gear 24 engaged with ring gear 20, bevel gear 26 on a shaft 25 of gear 24, and bevel gear 27 engaged with bevel gear 26.

Figure 2:
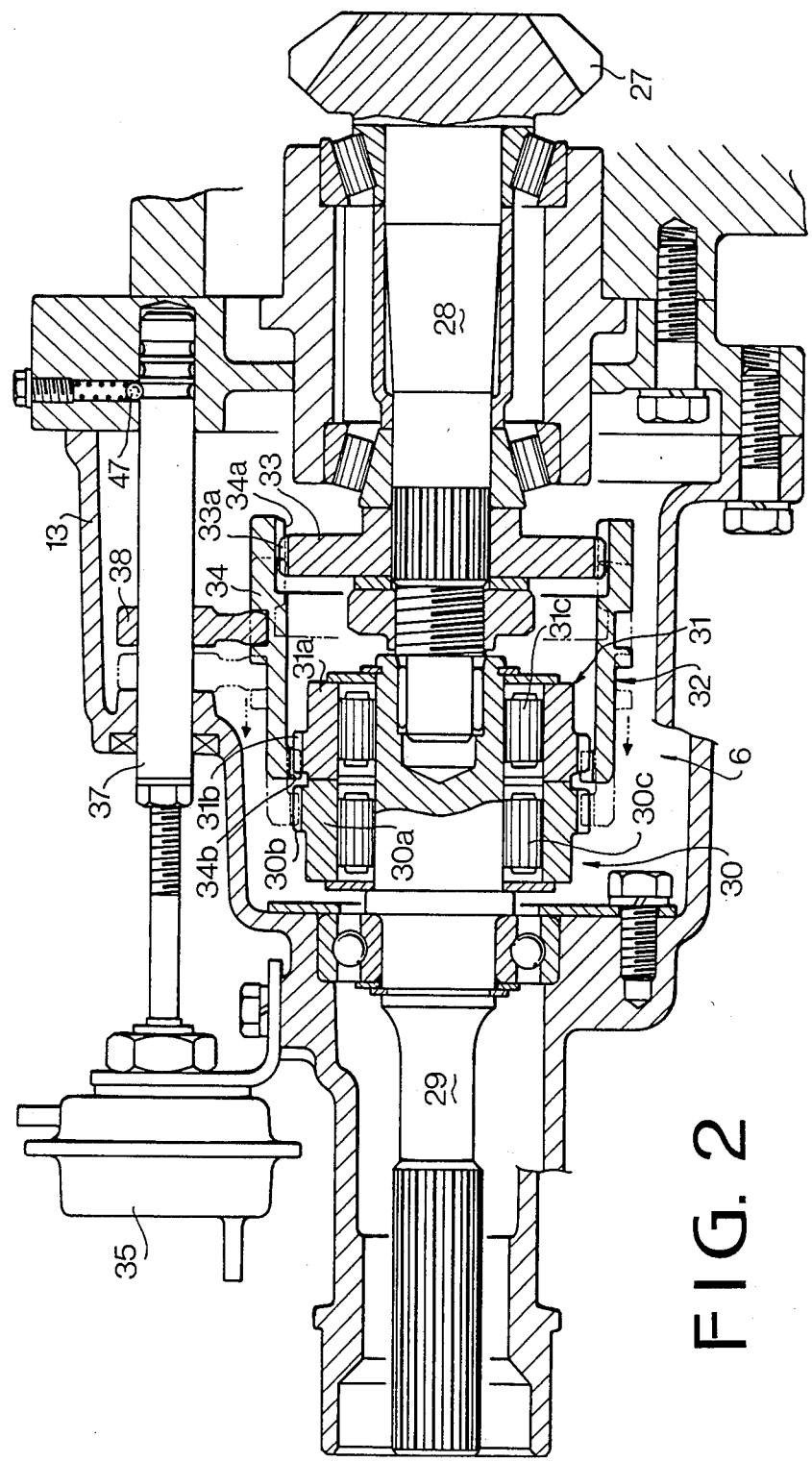
FIG. 2 is a sectional view of a main portion of the system.

Referring to FIG. 2, a transfer drive shaft 28 of the bevel gear 27 and a driven shaft 29 connected to the propeller shaft 7 are co-axially disposed, and both shafts 28 and 29 are coupled through double overrunning clutch 6. The double overrunning clutch 6 comprises a forward overrunning clutch 30 and reverse overrunning clutch 31 each of which is in the form of a freewheel. Clutches 30 and 31 comprise outer races 30a, 31a and spragges 30c, 31c disposed between the outer races 30a, 31a and shaft 29, respectively. Spragges are able to rotate on the shaft 29 in one direction. A forward/reverse selecting device 32 is provided. The device has a hub 33 secured to the shaft 28 and an axially slidable sleeve 34. The sleeve 34 has two inside toothings 34a and 34b. The toothing 34a is permanently engaged with a toothing 33a of the hub 33. The toothing 34b is selectively engaged with a toothing 30b of the forward overrunning clutch 30 or with a toothing 31b of the reverse overrunning clutch 31. The toothing 34b has such a width that it engages with both toothings 30b and 31b at the same time. Such a selection is performed by shifting the sleeve 34 to one of three axial positions, namely, a forward position, reverse position and lock position. The forward overrunning clutch 30 is so arranged as to transmit the rotation of the outer race 30a in the forward driving direction to the shaft 29 and as to allow the rotation of the shaft 29 in this direction at higher speed than the outer race, i.e. in advance of the race. The reverse overrunning clutch 31 is arranged oppositely. As shown in FIG. 4a, each of the toothings 30b and 31b of the clutches 30 and 31 is chamfered at an end opposing the toothing 34b. A chamfer 30d of the toothing 30b is formed at an angle α toward a freely rotatable direction F1 of the outer race 30a. A chamfer 31d of the toothing 31b is also formed at the angle α toward a freely rotatable direction F2 of the outer race 31a, which is opposite to the rotatable direction F1 of the outer race 30a. The toothing 34b has chamfers 34c and 34d at both ends at angle α so that the chamfer 34c and 34d may engage with the chamfers 30d and 31d, respectively.

The sleeve 34 has an annular groove on the periphery thereof, in which a shifter fork 38 is slidably engaged. The shifter fork 38 is operatively connected to a diaphragm 36 (FIG. 1) in a vacuum operated actuator 35 through a rod 37. A ball lock device 47 is provided to position the rod 37 at one of the three positions.

As shown in FIG. 1a, the diaphragm 36 of the actuator 35 is held by springs 40 and 41 on both sides thereof to an intermediate lock position when both vacuum chambers 39a and 39b defined by the diaphragm are communicated with the atmosphere as described hereinafter. The vacuum chambers 39a and 39b are communicated with ports 61a and 62a of solenoid operated valves 61 and 62, respectively (FIG. 1b). The solenoid operated valve 61 and 62 have atmosphere ports 61b and 62b, vacuum ports 61c and 62c, and solenoids 61d and 62d respectively. Both vacuum ports 61c and 62c are communicated with an intake manifold 65 of the engine 1 through a passage 44 having a check valve 45 so as to be supplied with vacuum pressure in the intake manifold 65. Each valve has a valve body 66 for selectively closing the atmosphere port or vacuum port in accordance with energization or deenergization of the solenoid. When the solenoid is energized by the output of a control circuit 46, the valve body 66 closes the atmosphere port and opens the vacuum port to communicate the vacuum chamber of the actuator 35 with the intake manifold 65. The control circuit 46, is provided with a reverse switch 50 which is closed when a reverse gear in the transmission 3 is selected, and a lock switch 51 for locking the overrunning clutches 30 and 31.

When the vehicle is driven forward, reverse switch 50 and lock switch 51 are both open, so that the solenoid 61d of the valve 61 is energized to open the vacuum port 61c. The vacuum chamber 39a of actuator 35 is communicated with the intake manifold 65 through passage 63, valve 61 and passage 44, and the diaphragm 36 is deflected to the left by the vacuum pressure in the intake manifold to draw the rod 37 to the left (forward position). Thus, the sleeve 34 is shifted to the left, so that toothing 34b engages with toothing 30b of the forward overrunning clutch 30. Even though the toothing 30b is positioned opposite to the toothing 34b as shown in FIG. 4b, the chamfer 34c abuts against the chamfer 30d to produce a component on the toothing 30b in the free direction F1. Accordingly, the outer race 30a is rotated in the free direction, so that the toothing 34b can smoothly move to the left as shown in FIG. 4a. Thus, the engagement of the sleeve 34 and the clutch 30 is smoothly performed.

When the clutch 2 is engaged, the output of the change-speed transmission 3 is transmitted to the front wheels 10 through shaft 28, forward overrunning clutch 30, shaft 29 and propeller shaft 7. When the vehicle turns a corner, the front wheels 10 rotate faster than the rear wheels 23. That is, the shaft 29 rotates faster than the outer race 30a in advance of it. However, the overrunning clutch 30 permits such a faster rotation of the shaft 29. Thus, the difference between the speeds of the front and rear wheels is absorbed in the clutch, and the vehicle turns the corner smoothly without braking phenomenon.

When the transmission 3 is changed to reverse driving state, the reverse switch 50 is closed. Accordingly, the solenoid 62d is energized so that vacuum chamber 39b is communicated with the intake manifold 65, shifting the rod 37 to the right (reverse position). Thus the reverse overrunning clutch 31 is selected in the same manner as described above but for the reverse driving. In reverse driving, the same operation as the forward driving is performed but in reverse.

When the lock switch 51 is closed, the solenoids 61d, 62d are de-energized to communicate vacuum chambers 39a, 39b with the atmosphere. The diaphragm 36 is located at the neutral position by springs 40, 41 to position the rod 37 at the lock position. Accordingly, the toothing 34b of the sleeve 34 engages with both toothings 30b and 31b to lock the double overrunning clutch 6. Thus, the directly connected four-wheel driving mode is established. Therefore, the vehicle is safely driven by four the wheels without skidding of wheels.

While the presently preferred embodiments of the present invention has been shown and described, it is to be understood that this disclosure is for the purpose of illustration and that various changes and modifications may be made without departing from the spirit and scope of the invention as set forth in the appended claims.

What is claimed is:

1. In a power transmission system for a four-wheel drive vehicle, having a transmission, a transmitting system for transmitting output of the transmission to front and rear wheels of the vehicle, the transmitting system including a double overrunning clutch comprising a forward overrunning clutch including a forward outer race provided with forward outer teeth on a periphery thereof, and forward sprages operatively disposed between said forward outer race and a shaft of said transmitting system, said shaft being rotatably connected to the front wheels, said forward overrunning clutch permitting faster rotation of said front wheels than said rear wheels in a first rotatable direction of said shaft corresponding to forward driving direction of the vehicle to prevent a tight corner braking phenomenon in said forward driving direction, and a reverse overrunning clutch including a reverse outer race provided with reverse outer teeth on a periphery thereof, and reverse sprages operatively disposed between said reverse outer race and said shaft of said transmitting system, said reverse overrunning clutch permitting faster rotation of said front wheels than said rear wheels in a second rotatable direction of said shaft corresponding to reverse driving of the vehicle to prevent said tight corner braking phenomenon in said reverse driving direction, the improvement in the system which comprises selecting means comprising an axially slidable sleeve rotatably connected to said transmitting system and provided with inner teeth selectively engagable separately or simultaneously together with said forward and/or reverse outer teeth, respectively, of the forward and reverse overrunning clutches for selectively engaging said forward and/or reverse overrunning clutches in said transmitting system in order to transmit said output to said front wheels, said inner teeth when engaging simultaneously together with said forward and reverse outer teeth locks said double overrunning clutch establishing a directly connected four-wheel driving mode, each of said forward outer teeth forming a first chamfer facing with a predetermined angle toward the first rotatable direction, each of said reverse outer teeth forming a second chamfer facing with said predetermined angle toward the second rotatable direction, and each of said inner teeth at both ends forming third and fourth chamfers respectively with said predetermined angle complementary to said first and second chamfers, respectively, so as to smoothly establish the directly connected non-overrunable four-wheel driving mode.

2. The transmission system according to claim 1, wherein said inner teeth each have a trapezoidal shape in front view tapering to a radially inner free end, the spacing between the forward and reverse outer teeth has a trapezoidal shape corresponding to the trapezoidal shape of said inner teeth and with longitudinal length smaller than the longitudinal length of the trapezoidal shape of said inner teeth.

3. The transmission system according to claim 1, wherein said chamfers each in plan view define a single line extending from one side to the other side of the corresponding teeth.

* * * * *